United States Patent
Do et al.

(10) Patent No.: US 8,139,036 B2
(45) Date of Patent: Mar. 20, 2012

(54) NON-INTRUSIVE CAPTURE AND DISPLAY OF OBJECTS BASED ON CONTACT LOCALITY

(75) Inventors: Lydia M. Do, Raleigh, NC (US); Pamela A. Nesbitt, Tampa, FL (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 852 days.

(21) Appl. No.: 11/868,513

(22) Filed: Oct. 7, 2007

(65) Prior Publication Data

US 2009/0091555 A1    Apr. 9, 2009

(51) Int. Cl.
G06F 3/041 (2006.01)

(52) U.S. Cl. ......... 345/173; 345/175; 358/474; 358/488

(58) Field of Classification Search ................... 345/173, 345/174, 175, 176, 177; 382/322; 250/363.02; 359/17; 358/474, 488; 715/790–796
See application file for complete search history.

(56) References Cited

U.S. PATENT DOCUMENTS

| | | | |
|---|---|---|---|
| 3,873,769 A | 3/1975 | Cotter | |
| 4,393,410 A | 7/1983 | Ridge et al. | |
| 4,577,058 A | 3/1986 | Collins | |
| 4,771,336 A | 9/1988 | Ohtorii | |
| 5,574,577 A | 11/1996 | Wally, Jr. et al. | |
| 5,630,168 A | 5/1997 | Rosebrugh et al. | |
| 5,838,326 A | 11/1998 | Card et al. | |
| 6,014,662 A | 1/2000 | Moran et al. | |
| 6,561,678 B2 | 5/2003 | Loughrey | |
| 6,571,279 B1 | 5/2003 | Herz et al. | |
| 6,636,831 B1 | 10/2003 | Profit, Jr. et al. | |
| 6,806,636 B2 | 10/2004 | Kang et al. | |
| 6,839,669 B1 | 1/2005 | Gould et al. | |
| 6,850,252 B1 | 2/2005 | Hoffberg | |
| 6,970,821 B1 | 11/2005 | Shambaugh et al. | |
| 6,982,649 B2 | 1/2006 | Blum et al. | |
| 6,999,932 B1 | 2/2006 | Zhou | |

(Continued)

FOREIGN PATENT DOCUMENTS

DE    19804028 A1    8/1998

(Continued)

OTHER PUBLICATIONS

PCT Search Report; Dec. 29, 2008; PCT Application No. PCT/EP2008/063007.

(Continued)

*Primary Examiner* — Amare Mengistu
*Assistant Examiner* — Koosha Sharifi-Tafreshi
(74) *Attorney, Agent, or Firm* — Van Leeuwen & Van Leeuwen; Jeffrey S. LaBaw (57) ABSTRACT

Methods, apparatus, or products for displaying an image of an object placed on a surface computer, the surface computer including a surface, surface computer capable receiving multi-touch input through the surface and rendering display output on the surface, the surface computer including a scanner, that include: detecting, by the surface computer, an object placed on the surface; identifying, by the surface computer, a region of the surface upon which the object is placed; scanning, by the surface computer using the scanner, the identified region of the surface to create an object image of the object; and rendering, by the surface computer, the object image within the identified region without modifying portions of any other images rendered on the surface outside the identified region.

12 Claims, 3 Drawing Sheets

U.S. PATENT DOCUMENTS

| | | | |
|---|---|---|---|
| 7,035,804 B2 | 4/2006 | Saindon et al. | |
| 7,174,056 B2 | 2/2007 | Silverbrook et al. | |
| 7,209,124 B2 | 4/2007 | Hunt et al. | |
| 7,441,706 B1 | 10/2008 | Schuessler et al. | 235/462.15 |
| 7,830,408 B2 | 11/2010 | Asthana et al. | |
| 2002/0178190 A1 | 11/2002 | Pope et al. | 707/530 |
| 2002/0191072 A1 | 12/2002 | Henrikson | |
| 2003/0066073 A1 | 4/2003 | Rebh | |
| 2003/0078840 A1 | 4/2003 | Strunk et al. | 705/14 |
| 2003/0142135 A1 | 7/2003 | Hori et al. | 345/781 |
| 2003/0160862 A1 | 8/2003 | Charlier et al. | |
| 2003/0204403 A1 | 10/2003 | Browning | 704/270 |
| 2004/0019482 A1 | 1/2004 | Holub | |
| 2004/0051644 A1 | 3/2004 | Tamayama et al. | |
| 2004/0199597 A1 | 10/2004 | Libbey et al. | |
| 2004/0201871 A1* | 10/2004 | Risheq | 358/474 |
| 2004/0237033 A1 | 11/2004 | Woolf et al. | |
| 2005/0110964 A1 | 5/2005 | Bell et al. | |
| 2005/0149364 A1 | 7/2005 | Ombrellaro | |
| 2005/0149620 A1 | 7/2005 | Kirkland et al. | 709/207 |
| 2005/0149621 A1 | 7/2005 | Kirkland et al. | 709/207 |
| 2005/0154595 A1 | 7/2005 | Bodin | |
| 2005/0182680 A1 | 8/2005 | Jones et al. | |
| 2005/0183023 A1 | 8/2005 | Maruyama et al. | |
| 2006/0001650 A1 | 1/2006 | Robbins et al. | |
| 2006/0036944 A1* | 2/2006 | Wilson | 715/702 |
| 2006/0073891 A1 | 4/2006 | Holt | |
| 2006/0117669 A1 | 6/2006 | Baloga et al. | |
| 2006/0126128 A1* | 6/2006 | Ahmed et al. | 358/474 |
| 2006/0132501 A1 | 6/2006 | Nonaka et al. | |
| 2006/0146034 A1 | 7/2006 | Chen et al. | |
| 2006/0176524 A1 | 8/2006 | Willrich | |
| 2006/0203208 A1* | 9/2006 | Thielman et al. | 353/74 |
| 2006/0204030 A1 | 9/2006 | Kogure et al. | |
| 2006/0267966 A1 | 11/2006 | Grossman et al. | |
| 2006/0287963 A1 | 12/2006 | Steeves et al. | |
| 2006/0294247 A1 | 12/2006 | Hinckley et al. | 709/228 |
| 2007/0005500 A1 | 1/2007 | Steeves et al. | |
| 2007/0026372 A1 | 2/2007 | Huelsbergen | |
| 2007/0033637 A1 | 2/2007 | Yami et al. | 726/2 |
| 2007/0055929 A1 | 3/2007 | Giannetti et al. | |
| 2007/0079249 A1 | 4/2007 | Pall et al. | 715/758 |
| 2007/0083666 A1 | 4/2007 | Apelbaum | |
| 2007/0143103 A1 | 6/2007 | Asthana et al. | |
| 2007/0143624 A1 | 6/2007 | Steeves | |
| 2007/0143690 A1 | 6/2007 | Nakajima et al. | |
| 2007/0156811 A1 | 7/2007 | Jain et al. | |
| 2007/0201745 A1 | 8/2007 | Wang et al. | |
| 2007/0220444 A1 | 9/2007 | Sunday et al. | |
| 2007/0288599 A1 | 12/2007 | Saul et al. | 709/218 |
| 2008/0028321 A1 | 1/2008 | Weksler et al. | |
| 2008/0066014 A1 | 3/2008 | Misra | |
| 2008/0088593 A1 | 4/2008 | Smoot | |
| 2008/0122803 A1* | 5/2008 | Izadi et al. | 345/175 |
| 2008/0127302 A1 | 5/2008 | Qvarfordt et al. | |
| 2008/0168403 A1 | 7/2008 | Westerman et al. | |
| 2008/0192059 A1 | 8/2008 | Kennedy | |
| 2008/0198138 A1 | 8/2008 | McFarlane et al. | 345/173 |
| 2008/0214233 A1 | 9/2008 | Wilson et al. | 455/55.1 |
| 2008/0270230 A1 | 10/2008 | Hendrickson et al. | |
| 2008/0281851 A1* | 11/2008 | Izadi et al. | 707/102 |
| 2008/0288862 A1 | 11/2008 | Smetters et al. | 715/255 |
| 2009/0002327 A1* | 1/2009 | Wilson et al. | 345/173 |
| 2009/0085877 A1 | 4/2009 | Chang et al. | 345/173 |
| 2009/0113294 A1 | 4/2009 | Sanghavi et al. | |
| 2009/0138723 A1 | 5/2009 | Nyang et al. | |
| 2009/0150983 A1 | 6/2009 | Saxena et al. | |
| 2009/0328163 A1 | 12/2009 | Preece | |

FOREIGN PATENT DOCUMENTS

| | | |
|---|---|---|
| EP | 0450196 A1 | 4/1990 |
| EP | 0543566 A2 | 11/1992 |
| EP | 1 315 071 A | 5/2003 |
| EP | 1 621 989 A2 | 2/2006 |
| JP | 2000 148396 A | 5/2000 |
| JP | 2006139615 A | 6/2006 |
| WO | WO 01/01391 A1 | 1/2001 |
| WO | WO 03/036415 A2 | 5/2003 |

OTHER PUBLICATIONS

Bohte, et al.; "Market-Based Recommendation: Agents that Compete for Consumer Attention"; Nov. 2004; pp. 420-448; vol. 4, No. 4; ACM Transactions on Internet Technology; Broadway, New York.

Lemon, et al.; "Multithreaded Context for Robust Conversational Interfaces: Context-Sensitive Speech Recognition and Interpretation of Corrective Fragments"; Sep. 2004; pp. 241-267; vol. 11, No. 3; ACM Transactions on Computer-Human Interaction; Broadway, New York.

Gabriel, et al.; "Conscientious Software"; Oct. 2006; pp. 433-450; ACM 1-59593-348-4/06/0010; Sun Microsystems, Inc.; Portland, Oregon.

McTear; "Spoken Dialogue Technology: Enabling the Conversational User Interface"; Mar. 2002; pp. 90-169; vol. 34, No. 1; ACM Computing Surveys.

Jagadish, et al.; "Making Database Systems Usable"; SIGMOD'07; Jun. 12-14, 2007; pp. 13-24; ACM 978-1-59593-686-08/07/0006; Beijing, China.

Marshall, et al.; Exploring the Relationship Between Personal and Public Annotations; JCDL'04; Jun. 7-11, 2004; pp. 349-357; ACM 1-58113-832-6/04/0006; Tucson, Arizona.

Ashdown, et al.; "Escritoire: A Personal Projected Display"; IEEE Multimedia, vol. 12, Issue 1; Jan.-Mar. 2005; pp. 34-42.

Athanasopoulos, et al.; Enhanced CAPTCHAs: Using Animation to Tell Humans and Computers Apart; 2006; pp. 97-108; CMS 2006-LNCS 4237; IFIP.

PCT Search Report and Written Opinion, Feb. 5, 2009; PCT Application No. PCT/EP2008/063006.

Microsoft: "Microsoft Launches New Product Category: Surface Computing Comes to Life in Restaurants, Hotels, Retail Locations and Casino Resorts" Microsoft Website, [Online] May 29, 2007, p. 13, XP00251268, Carlsbad, California, US.

Office Action, U.S. Appl. No. 11/869,313, Aug. 5, 2010.
Office Action, U.S. Appl. No. 11/868,766, Aug. 6, 2010.
Office Action, U.S. Appl. No. 11/868,513, Aug. 6, 2010.

Athanasopoulos, Elias; Antonatos, Spiros, "Enhanced CAPTCHAs: Using Animation to tell Humans and Computers Apart", IFIP 2006, pp. 97-108.

Izadi et al. (Dynamo: A public interactive surface supporting cooperative sharing and exchange of media; pp. 1-9; copyright 2003).

Office Action, U.S. Appl. No. 11/868,216, Aug. 20, 2010.
Office Action, U.S. Appl. No. 11/950,872, Oct. 15, 2010.

Fetzer, C., Kaefer, K., Augsten, T., Meusel, R., Kanitz, D., Stoff, T., Becker, T., Holt, C. and Baudisch, P. Multitoe: High—Precision Interation with Back-Projected Floors Based on High-Resolution Multi-Touch Input to appear in Proceedings of UIST 2010, New York, NY, Oct. 3-6, 2010, 10 pages.

Final Office Action, U.S. Appl. No. 11/869,313, Dec. 10, 2010.
Office Action, U.S. Appl. No. 11/868,513, Dec. 10, 2010.
Office Action, U.S. Appl. No. 11/869,987, Nov. 30, 2010.
Final Office Action, U.S. Appl. No. 11/868,766, Dec. 9, 2010.
Office Action, U.S. Appl. No. 11/868,474, Oct. 29, 2010.
Office Action, U.S. Appl. No. 11/869,313, Jan. 6, 2011.
Final Office Action for co-pending U.S. Appl. No. 11/868,216, mailed Mar. 3, 2011, 21 pages.
Final Office Action for co-pending U.S. Appl. No. 11/868,474, mailed Mar. 1, 2011, 25 pages.

Bollacker, et al., "A System for Automatic Personalized Tracking of Scientific Literature on the Web," Proceedings of the Fourth ACM Conference on Digital Libraries, Aug. 11-14, 1999, pp. 105-113, ACM Press, New York.

Final Office Action for U.S. Appl. No. 11/869,313, mailed May 24, 2011, 21 pages.

Gronbaek et al., "iGameFloor—A Platform for Co-Located Collaborative Games," ACE'07, Jun. 13-15, 2007.

Notice of Allowance for U.S. Appl. No. 11/869,987, mailed May 16, 2011, 11 pages.

Office Action for U.S. Appl. No. 11/868,766, mailed Apr. 14, 2011, 19 pages.

Office Action for U.S. Appl. No. 11/868,474, mailed Jun. 23, 2011, 18 pages.

Final Office Action for U.S. Appl. No. 11/868,474 (Do et al., "Displaying Documents to a Plurality of Users of a Surface Computer," filed Oct. 6, 2007), mailed Oct. 18, 2011, 19 pages.

Office Action for U.S. Appl. No. 11/868,216, mailed Aug. 3, 2011, 14 pages.

Final Office Action for U.S. Appl. No. 11/868,766, mailed Aug. 4, 2011, 19 pages.

Bohte, et al.; "Market-Based Recommendation: Agents That Compete for Consumer Attention"; ACM Transactions on Internet Technology; Nov. 2004; pp. 420-448; vol. 4; New York, NY.

Bollacker, et al.; "A System for Automatic Personalized Tracking of Scientific Literature on the Web"; NEC Research Institute; pp. 105-113; Princeton, NJ.

Gabriel, et al.; "Conscientious Software"; OOPSLA'06; Oct. 22-26, 2006; ACM1-59593-348-4/06/0010; Portland, Oregon.

Jagadish, et al.; "Making Database Systems Usable"; SIGMOD'07; Jun. 12-14, 2007; pp. 13-24; ACM 978-1-59593-686-8/07/0006; Beijing, China.

Marshal, et al.; Exploring the Relationship Between Personal and Public Annotations; JCDL'04; Jun. 7-11, 2004; pp. 349-357; ACM 1-58113-832-6/04/0006; Tucson, Arizona.

* cited by examiner

NON-INTRUSIVE CAPTURE AND DISPLAY OF OBJECTS BASED ON CONTACT LOCALITY

BACKGROUND OF THE INVENTION

1. Field of the Invention

The field of the invention is data processing, or, more specifically, methods, apparatus, and products for displaying an image of an object placed on a surface computer.

2. Description of Related Art

Multi-touch surface computing is an area of computing that has made tremendous advancements over the last few years. Multi-touch surface computing allows a user to interact with a computer through a surface that is typically implemented as a table top. The computer renders a graphical user interface ('GUI') on the surface and users may manipulate GUI objects directly with their hands using multi-touch technology as opposed to using traditional input devices such as a mouse or a keyboard. In such a manner, the devices through which users provide input and receive output are merged into a single surface, which provide an intuitive and efficient mechanism for users to interact with the computer. As surface computing becomes more ubiquitous in everyday environments, readers will appreciate advancements in how users may utilize surface computing to intuitively and efficiently perform tasks that may be cumbersome using traditional input devices such as a keyboard and mouse.

SUMMARY OF THE INVENTION

Methods, apparatus, or products for displaying an image of an object placed on a surface computer, the surface computer including a surface, surface computer capable receiving multi-touch input through the surface and rendering display output on the surface, the surface computer including a scanner, that include: detecting, by the surface computer, an object placed on the surface; identifying, by the surface computer, a region of the surface upon which the object is placed; scanning, by the surface computer using the scanner, the identified region of the surface to create an object image of the object; and rendering, by the surface computer, the object image within the identified region without modifying portions of any other images rendered on the surface outside the identified region.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
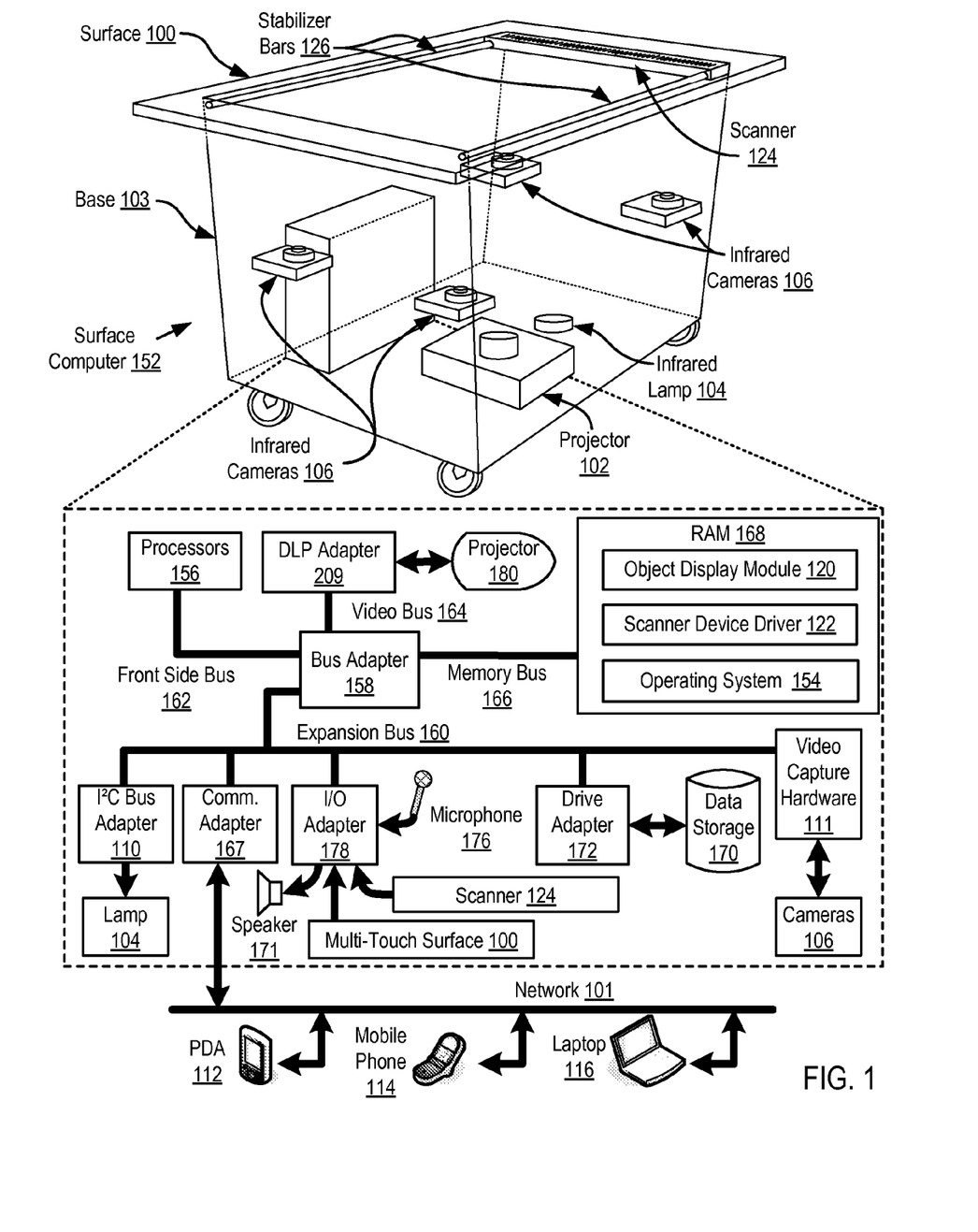
FIG. 1 sets forth a functional block diagram of an exemplary surface computer capable of displaying an image of an object placed on the surface computer according to embodiments of the present invention.

Exemplary methods, apparatus, and products for displaying an image of an object placed on a surface computer in accordance with the present invention are described with reference to the accompanying drawings, beginning with FIG. 1. FIG. 1 sets forth a functional block diagram of an exemplary surface computer (152) capable of displaying documents to a plurality of users according to embodiments of the present invention. The exemplary surface computer (152) of FIG. 1 includes a surface (100) mounted atop a base (103) that houses the other components of the surface computer (152). The surface (100) may be implemented using acrylic, glass, or other materials as will occur to those of skill in the art. In addition to the computing functionality provided by the surface computer (152), the surface (100) of FIG. 1 may also serve as a table top for a coffee table, dining table, a conference table, or some other table as will occur those of skill in the art. Examples of a surface computer that may be improved for displaying personalized documents to users according to embodiments of the present invention may include the Microsoft Surface™ and the ROSIE Coffee Table by Savant. Readers will note that in a preferred embodiment, the surface (100) is sufficiently large to accommodate several individuals seated around the display surface such as, for example, when the surface computer serves as a conference table.

The exemplary surface computer (152) of FIG. 1 is capable of receiving multi-touch input through the surface (100) and rendering display output on the surface (100). Multi-touch input refers to the ability of the surface computer (152) to recognize multiple simultaneous points of contact between objects and the surface (100). These objects may include hands, fingers, portable electronic devices, papers, cups, plates, or any other object as will occur to those of skill in the art. Such recognition may include the position and pressure or degree of each point of contact, which allows gestures and interaction with multiple fingers or hands through intuitive gestures. Depending largely on the size of the surface, a surface computer typically supports interaction with more than one user or object simultaneously. In the example of FIG. 1, the surface computer (100) supports interaction with a plurality of users.

In the example of FIG. 1, the exemplary surface computer (152) receives multi-touch input through the surface (100) by reflecting infrared light off of objects on top of the surface (100) and capturing the reflected images of the objects using multiple infrared cameras (106) mounted inside the base (103). Using the reflected infrared images, the surface computer (100) may then perform pattern matching to determine the type of objects that the images represent. The objects may include fingers, hands, portable electronic devices, papers, and so on. The infrared light used to generate the images of the objects is provided by an infrared lamp (104) mounted to the base (103) of the surface computer (152). Readers will note that infrared light may be used to prevent any interference with users' ability to view the surface (100) because infrared light is typically not visible to the human eye.

Although the exemplary surface computer (152) of FIG. 1 above receives multi-touch input through the surface (100) using a system of infrared lamps and cameras, readers will note that such implementation are for explanation only and not for limitation. In fact, other embodiments of a surface computer for displaying documents to a plurality of users according to embodiments of the present invention may use other technologies as will occur to those of skill in the art such as, for example, frustrated total internal reflection. Frustrated total internal reflection refers to a technology that disperses light through a surface using internal reflection. When an object comes in contact with one side of the surface, the dispersed light inside the surface scatters onto light detectors on the opposite side of the surface, thereby identifying the point at which the object touched the surface. Other technologies may include dispersive signal technology and acoustic pulse recognition.

In the example of FIG. 1, the surface computer (152) renders display output on the surface (100) using a projector (102). The projector (102) renders a GUT on the surface (100) for viewing by the users. The projector (102) of FIG. 1 is implemented using Digital Light Processing ('DLP') technology originally developed at Texas Instruments. Other technologies useful in implementing the projector (102) may include liquid crystal display ('LCD') technology and liquid crystal on silicon ('LCOS') technology. Although the exemplary surface computer (152) of FIG. 1 above displays output on the surface (100) using a projector (102), readers will note that such an implementation is for explanation and not for limitation. In fact, other embodiments of a surface computer for displaying documents to a plurality of users according to embodiments of the present invention may use other technologies as will occur to those of skill in the art such as, for example, embedding a flat panel display into the surface (100).

The surface computer (152) of FIG. 1 also includes a scanner (124), a device that captures a digital image of an object. In the example of FIG. 1, the scanner (124) is implemented using a charged-coupled device ('CCD') array. The CCD array is a collection of tiny light-sensitive diodes, which convert photons into electrons. Each diode is called a photosite and is sensitive to light—the brighter the light that hits a single photosite, the greater the electrical charge that will accumulate at that site. The image of the object scanned reaches the CCD array through a series of mirrors, filters and lenses. The exact configuration of these components will vary from one embodiment to another. The scanner (124) of FIG. 1 includes one or more lamps to illuminate the object. The lamps may be implemented using a cold cathode fluorescent lamps ('CCFL'), xenon lamps, standard fluorescent lamps, diodes, or any other implementation as will occur to those of skill in the art. The size and number of lamps may be configured in the scanner (124) in any number of ways as will occur to those of skill in the art to provide varying levels of granularity regarding the portion of the surface (100) illuminated by the lamps. In some embodiments, only the lamps directly beneath the object being scanned will be turned on to prevent obscuring any remaining portions of the surface during the scanning process.

In the example of FIG. 1, the scanner (124), which includes the mirrors, lens, filters, CCD array, lamps, and so on, moves across the underside of the surface (100) by a belt that is attached to a stepper motor. The scanner (124) is attached to stabilizer bars (126) to ensure that there is no wobble or deviation as the scanner passes beneath the surface (100). As the scanner (124) passes beneath an object placed on the surface (100), the image of the object is reflected through a series of mirrors onto a lens. The lens splits the image into three smaller versions of the original. Each smaller version passes through a color filter, which is either red, green, or blue, onto a discrete section of the CCD array. The scanner (124) then combines the data from the three parts of the CCD array into a single full-color image.

Although the scanner (124) is described above using CCD technology, other scanning technologies may also be useful in embodiments of the present invention. For example, a scanner in some embodiments may be implemented using contact image sensor ('CIS') technology. CIS technology replaces the CCD array, mirrors, filters, lamp and lens with rows of red, green and blue light emitting diodes ('LEDs'). The image sensor mechanism, consisting of hundreds or thousands of individual sensors spanning the width of the surface (100), is placed very close to the surface (100) on which the object rests. When the object is scanned, the LEDs combine to provide white light. The illuminated image of the object is then captured by the row of sensors. Still further readers will appreciate that other scanning technologies may be used. The CCD scanner and the CIS scanner described above are for explanation only and not for limitation.

The surface computer (152) of FIG. 1 includes one or more computer processors (156) as well as random access memory ('RAM') (168). The processors (156) are connected to other components of the system through a front side bus (162) and bus adapter (158). The processors (156) are connected to RAM (168) through a high-speed memory bus (166) and to expansion components through an extension bus (168).

Stored in RAM (168) is an object display module (120), software that includes computer program instructions for displaying an image of an object placed on the surface computer of the surface computer (152) according to embodiments of the present invention. The object display module (120) operates generally for displaying an image of an object placed on the surface computer (152) according to embodiments of the present invention by: detecting an object placed on the surface; identifying a region of the surface upon which the object is placed; scanning, using the scanner, the identified region of the surface to create an object image of the object; and rendering the object image within the identified region without modifying any other images rendered on the surface outside the identified region. The object placed on the surface (100) may be implemented as a pictorial document such as a photograph or other printed graphic image, a text document, a hand, a portable computing device, or any other object as will occur to those of skill in the art.

Also stored in RAM (168) is a scanner device driver (122), a set of computer program instructions that provides a software interface for operating the scanner (124). The scanner device driver (122) exposes an application programming interface ('API') to the object display module (120) that may be used to scan a region of the surface (100) to create an image of any objects place on that particular region. In the example of FIG. 1, the scanner device driver (122) may be implemented in any number of ways and provide a variety of interfaces as will occur to those of skill in the art, including those according to the TWAIN specification promulgated by the TWAIN Working Group, the Image and Scanner Interface Specification ('ISIS') developed by Pixel Translations, the Scanner Access Now Easy ('SANE') specification, and so on.

Also stored in RAM (168) is an operating system (154). Operating systems useful for applying displaying an image of an object placed on a surface computer according to embodiments of the present invention may include or be derived from UNIX™, Linux™, Microsoft Vista™, Microsoft XP™, AIX™, IBM's i5/OS™, and others as will occur to those of skill in the art. The operating system (154), the scanner device driver (122), and the object display module (120) in the example of FIG. 1 are shown in RAM (168), but many components of such software typically are stored in non-volatile memory also, such as, for example, on a disk drive (170).

The surface computer (152) of FIG. 1 includes disk drive adapter (172) coupled through expansion bus (160) and bus adapter (158) to processor (156) and other components of the computing device (152). Disk drive adapter (172) connects non-volatile data storage to the computing device (152) in the form of disk drive (170). Disk drive adapters useful in computing devices for displaying an image of an object placed on a surface computer according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory ('EEPROM' or 'Flash' memory), RAM drives, and so on, as will occur to those of skill in the art.

The example surface computer (152) of FIG. 1 includes one or more input/output ('I/O') adapters (178). I/O adapters implement user-oriented input/output through, for example, software drivers and computer hardware for controlling output to devices such as computer display screens or speakers (171), as well as user input from user input devices such as, for example, microphone (176) for collecting speech input and the scanner (124) for capturing digital images of objects placed on the surface (100). The example surface computer (152) of FIG. 1 also includes a Digital Light Processing adapter (209), which is an example of an I/O adapter specially designed for graphic output to a projector (180). Video adapter (209) is connected to processor (156) through a high speed video bus (164), bus adapter (158), and the front side bus (162), which is also a high speed bus.

The exemplary surface computer (152) of FIG. 1 includes video capture hardware (111) that converts image signals received from the infrared cameras (106) to digital video for further processing, including pattern recognition. The video capture hardware (111) of FIG. 1 may use any number of video codec, including for example codec described in the Moving Picture Experts Group ('MPEG') family of specifications, the H.264 standard, the Society of Motion Picture and Television Engineers' 421M standard, or any other video codec as will occur to those of skill in the art. Although the video capture hardware (111) of FIG. 1 is depicted separately from the infrared cameras (106), readers will note that in some embodiment the video capture hardware (111) may be incorporated into the cameras (106). In such embodiments, the infrared camera (106) may connect to the other components of the surface computer through a Universal Serial Bus ('USB') connection, FireWire connection, or any other data communications connection as will occur to those of skill in the art.

The exemplary surface computer (152) of FIG. 1 also includes an Inter-Integrated Circuit ('I$^2$C') bus adapter (110). The I$^2$C bus protocol is a serial computer bus protocol for connecting electronic components inside a computer that was first published in 1982 by Philips. I$^2$C is a simple, low-bandwidth, short-distance protocol. Through the I$^2$C bus adapter (110), the processors (156) control the infrared lamp (104). Although the exemplary surface computer (152) utilizes the I$^2$C protocol, readers will note this is for explanation and not for limitation. The bus adapter (110) may be implemented using other technologies as will occur to those of ordinary skill in the art, including for example, technologies described in the Intelligent Platform Management Interface ('IPMI') specification, the System Management Bus ('SMBus') specification, the Joint Test Action Group ('JTAG') specification, and so on.

The exemplary surface computer (152) of FIG. 1 also includes a communications adapter (167) that couples the surface computer (152) for data communications with other computing devices through a data communications network (101). Such a data communication network (100) may be implemented with external buses such as a Universal Serial Bus ('USB'), or as an Internet Protocol ('IP') network or an Ethernet™ network, for example, and in other ways as will occur to those of skill in the art. Communications adapters implement the hardware level of data communications through which one computer sends data communications to another computer, directly or through a data communications network. Examples of communications adapters useful for displaying an image of an object placed on a surface computer according to embodiments of the present invention include modems for wired dial-up communications, Ethernet (IEEE 802.3) adapters for wired data communications network communications and 802.11 adapters for wireless data communications network communications.

FIG. 1 illustrates several computing devices (112, 114, 116) connected to the surface computer (152) for data communications through a network (101). Data communication may be established when the Personal Digital Assistant (112), the mobile phone (114), and the laptop (116) a placed on top of the surface (100). Through the images of the computing devices (112, 114, 116), the surface computer (152) may identify each device (112, 114, 116) and configure a wireless data communications connections with each device. The contents of any documents contained in the devices (112, 114, 116) may be retrieved into the surface computer's memory and rendered on the surface (100) for interaction with surface computer's users.

The arrangement of networks and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2A:
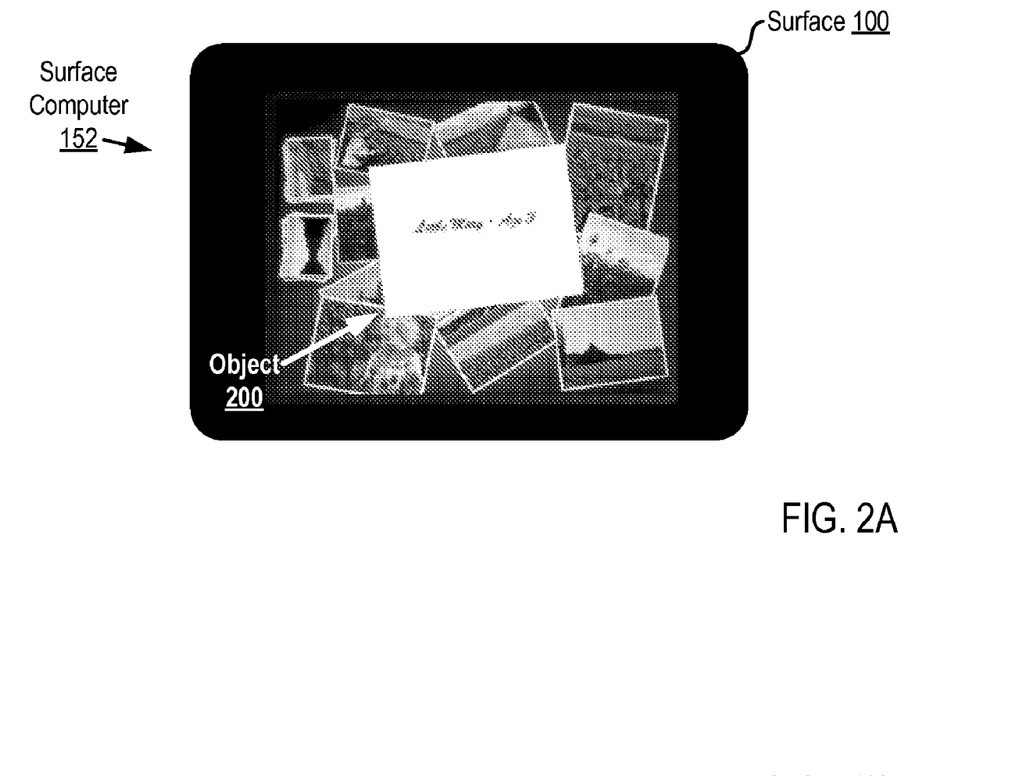
FIG. 2A sets forth a line drawing illustrating an exemplary surface useful in displaying an image of an object placed on a surface computer according to embodiments of the present invention.
Figure 2B:
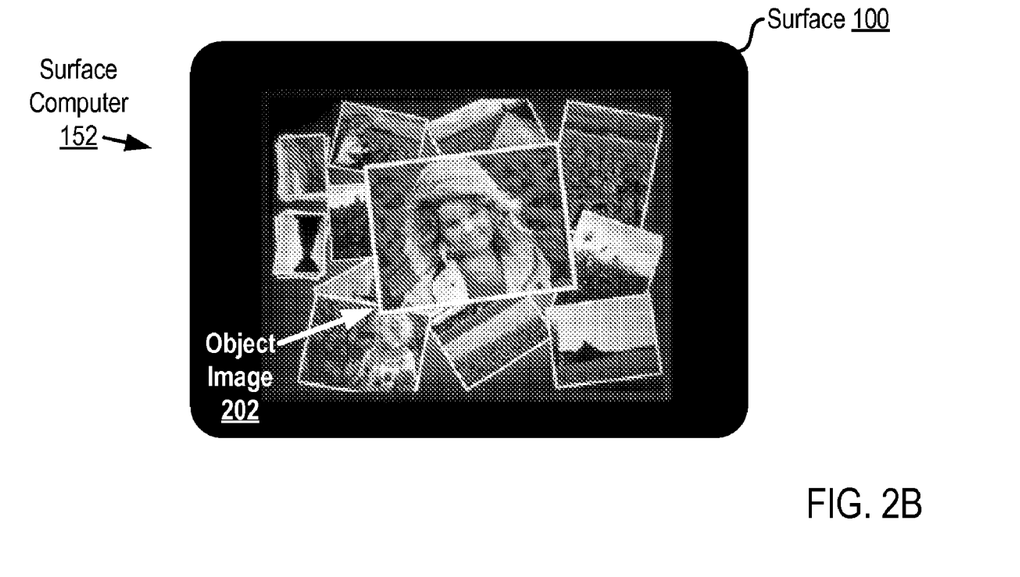
FIG. 2B sets forth a line drawing illustrating a further exemplary surface useful in displaying an image of an object placed on a surface computer according to embodiments of the present invention.

For further explanation, FIGS. 2A-B set forth line drawings illustrating exemplary surfaces useful in displaying an image of an object placed on a surface computer according to embodiments of the present invention. The surface (100) of FIGS. 2A-B is comprised in a surface computer (152). The surface computer is capable of receiving multi-touch input through the surface (100) and rendering display output on the surface (100). The surface computer (152) includes a scanner mounted beneath the surface (100) and capable of capturing an image of any of the objects placed on the surface (100).

In the example of FIG. 2A, the surface computer (152) detects an object (200) placed on the surface (100). The surface computer (152) of FIG. 2A identifies a region of the surface (100) upon which the object (200) is placed and scans the identified region of the surface (100) to create an object image (202) of the object (200) using the scanner mounted beneath the surface (100). In FIG. 2B, the surface computer renders the object image (202) within the identified region without modifying any other images rendered on the surface (100) outside the identified region. The object (200) in the example of FIG. 2A is implemented as a photograph, but readers will note that any object as will occur to those of skill in the art may be useful in displaying an image of an object placed on a surface computer according to embodiments of the present invention.

Figure 3:
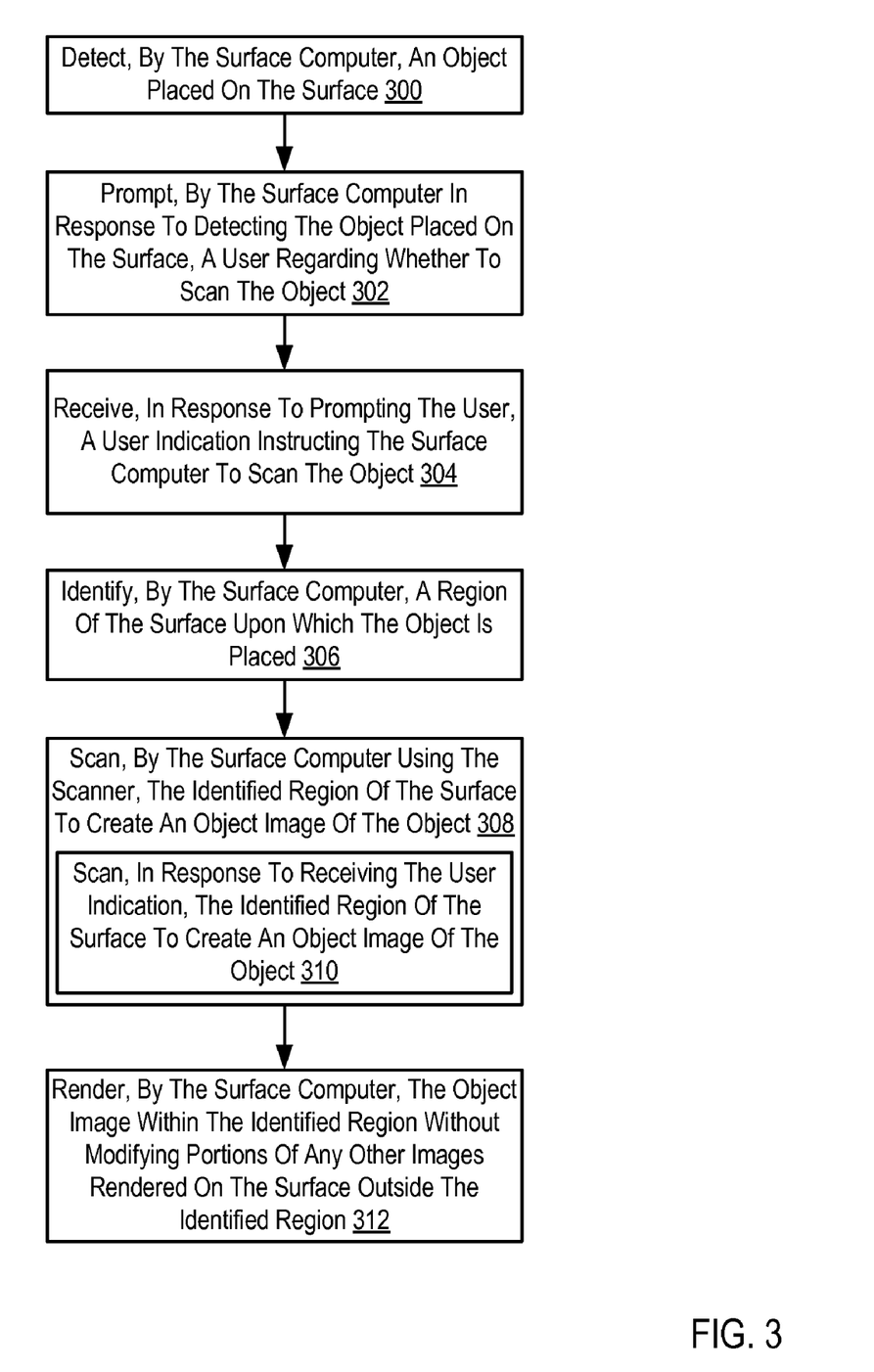
FIG. 3 sets forth a flow chart illustrating an exemplary method of displaying an image of an object placed on a surface computer according to embodiments of the present invention.

For further explanation, FIG. 3 sets forth a flow chart illustrating an exemplary method of displaying an image of an object placed on a surface computer according to embodiments of the present invention. The surface computer includes a surface and is capable of receiving multi-touch input through the surface and rendering display output on the surface. In such a manner, the surface provides an intuitive and efficient mechanism for users to interact with the surface computer. The surface computer described with respect to FIG. 3 includes a scanner capable of capturing an image of any of the objects placed on the surface.

The method of FIG. 3 includes detecting (300), by the surface computer, an object placed on the surface. The surface computer may detect (300) an object placed on the surface according to the method of FIG. 3 using surface image processing. Surface image processing may be used by the surface computer to detect when an object is placed on the surface by continuously capturing images of the surface and comparing the current image of the surface with the previous image. Any changes between the current image and previous image indicate that an object was placed on the surface or removed from the surface. To identify whether an object was placed on the surface or removed from the surface, the surface computer may use pattern matching or other recognition techniques as will occur to those of ordinary skill in the art.

In addition to surface image processing, the surface computer may detect (300) an object placed on the surface according to the method of FIG. 3 using frustrated total internal reflection. Using frustrated total internal reflection, the surface computer may detect when an object is placed on the surface by identifying any changes in the reflection pattern of the light internally reflected through the surface. Any changes in the reflection pattern indicate that an object was placed on the surface or removed from the surface. To identify whether an object was placed on the surface or removed from the surface, the surface computer may determine whether the current pattern has more or less scatter points than the previous pattern. The existence of additional scatter points indicates that an object was placed on the surface, while less scatter points indicates that an object was removed from the surface.

The method of FIG. 3 includes prompting (302), by the surface computer in response to detecting the object placed on the surface, a user regarding whether to scan the object. The surface computer may prompt (302) a user regarding whether to scan the object according to the method of FIG. 3 by rendering a dialog box on the surface that queries the user whether to scan the object. The dialog box may present the user with a choice of graphical user interface ('GUI') buttons that allows the user to instruct the surface computer to scan the detected object or to refrain from scanning the detected object. In other embodiments, the surface computer may prompt (302) a user regarding whether to scan the object according to the method of FIG. 3 by merely rendering a single 'scan' button on the surface for the user to provide an indication on whether to scan the detected object. The user instructs the surface computer to scan the object by pressing the 'scan' button. Readers will note that the exemplary manner of prompting a user described above is for explanation and not for limitation. Other ways of prompting a user regarding whether to scan the object as will occur to those of skill in the art are well within the scope of the invention.

The method of FIG. 3 also includes receiving (304), in response to prompting the user, a user indication instructing the surface computer to scan the object. The surface computer may receive (304) a user indication instructing the surface computer to scan the object according to the method of FIG. 3 by detecting a particular gesture performed by the user at a particular location on the surface that represents an instruction from the user to the surface computer to scan the object. The particular gesture performed by the user may be implemented as the user selecting a GUI button, operating a GUI component, performing a particular hand or finger motion, operation of a surface detectable electronic device, and so on. Readers will note that the exemplary manner of receiving the user indication described above is for explanation and not for limitation. Other ways of receiving the user indication to scan the object as will occur to those of skill in the art are well within the scope of the invention, including the use of voice commands or other input modalities.

The method of FIG. 3 includes identifying (306), by the surface computer, a region of the surface upon which the object is placed. The surface computer may identify (306) the region of the surface upon which the object is placed according to the method of FIG. 3 by detecting the edges of the object placed on the surface and determining the region of the surface on which the object is placed in dependence upon the edges of the object. The surface computer may detect the edges of the object placed on the surface using surface image processing or frustrated total internal reflection as discussed above.

The method of FIG. 3 also includes scanning (308), by the surface computer using the scanner, the identified region of the surface to create an object image of the object. As mentioned above, the surface computer received a user indication from the user instructing the surface computer to scan the object. Scanning (308) the identified region of the surface to create an object image of the object according to the method of FIG. 3 therefore includes scanning (310), in response to receiving the user indication, the identified region of the surface to create an object image of the object. The surface computer may scan (310) the identified region of the surface to create the object image according to the method of FIG. 3 by scanning an entire scan-able portion of the surface to create a surface image and selecting, as the object image, a portion of the surface image that corresponds to the identified region of the surface. That is, the surface computer creates an image of the entire scan-able portion of the surface and crops the image of the object from the image of the surface.

In other embodiments, however, the surface computer may scan (310) the identified region of the surface to create the object image according to the method of FIG. 3 by scanning only the identified region of the surface to create the object image of the object. That is, the surface computer only generates a digital image of the portion of the surface on which the object is placed—not of any other portions of the surface. The scanner of the surface computer may scan only the identified region of the surface to create the object image of the object by shining light on the object through only the identified region of the surface and receiving reflected light from the object. The scanner may then transform the reflected light into the object image using CCD technology, CIS technology, or any other technology as will occur to those of skill in the art.

The method of FIG. 3 also includes rendering (312), by the surface computer, the object image within the identified region without modifying portions of any other images rendered on the surface outside the identified region. The surface computer may render (312) the object image within the identified region without modifying portions of any other images rendered on the surface outside the identified region according to the method of FIG. 3 by altering the portion of the surface computer's memory that stores the content displayed on the identified region of the surface to contain the object image without alter the portion of the surface computer's memory that stores the content displayed outside identified region of the surface. In addition, the surface computer may render (312) the object image within the identified region according to the method of FIG. 3 by rendering the object image as received from the scanner or by rendering the object image in a reverse orientation. Readers will note that rendering the object image as received from the scanner or rendering the object image in a reverse orientation are for explanation only and not for limitation. Other ways of rendering the object image as will occur to those of skill in the art may also be useful in displaying an image of an object placed on a surface computer according to embodiments of the present invention.

Exemplary embodiments of the present invention are described largely in the context of a fully functional computer system for displaying an image of an object placed on a surface computer. Readers of skill in the art will recognize, however, that the present invention also may be embodied in a computer program product disposed on a computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of displaying an image of an object placed on a surface computer, the surface computer comprising a surface, the surface computer capable of receiving multi-touch input through the surface and rendering display output on the surface, the surface computer including a scanner, the method comprising:
   detecting, by the surface computer, an object placed on the surface, wherein a plurality of previously scanned images are rendered on the surface, and wherein the object overlaps at least one of the previously scanned images rendered on the surface when the object placed on the surface;
   identifying, by the surface computer, a region of the surface upon which the object is placed;
   scanning, by the surface computer using the scanner, an entire scan-able portion of the surface to create a surface image;
   selecting, as an object image, a portion of the surface image that corresponds to the identified region of the surface;
   cropping the object image from the surface image; and
   rendering, by the surface computer, the object image on the surface, wherein the object image is rendered wholly within the identified region of the surface without modifying portions of any of the plurality of previously scanned images rendered on the surface outside the identified region.

2. The method of claim 1 wherein the object is a pictorial document.

3. The method of claim 1 wherein the object is a text document.

4. A surface computer for displaying an image of an object placed on a surface computer, the surface computer comprising a surface, the surface computer capable of receiving multi-touch input through the surface and rendering display output on the surface, the surface computer including a scanner, the surface computer comprising a computer processor, a non-transitory computer memory operatively coupled to the computer processor, the non-transitory computer memory having disposed within it computer program instructions capable of:
   detecting, by the surface computer, an object placed on the surface, wherein a plurality of previously scanned images are rendered on the surface, and wherein the object overlaps at least one of the previously scanned images rendered on the surface when the object placed on the surface;
   identifying, by the surface computer, a region of the surface upon which the object is placed;
   scanning, by the surface computer using the scanner, an entire scan-able portion of the surface to create a surface image;
   selecting, as an object image, a portion of the surface image that corresponds to the identified region of the surface;
   cropping the object image from the surface image; and
   rendering, by the surface computer, the object image on the surface, wherein the object image is rendered wholly within the identified region of the surface without modifying portions of any of the plurality of previously scanned images rendered on the surface outside the identified region.

5. A computer program product for displaying an image of an object placed on a surface computer, the surface computer comprising a surface, the surface computer capable of receiving multi-touch input through the surface and rendering display output on the surface, the surface computer including a scanner, the computer program product disposed in a non-transitory computer readable medium, the computer program product comprising computer program instructions capable of:
   detecting, by the surface computer, an object placed on the surface, wherein a plurality of previously scanned images are rendered on the surface, and wherein the object overlaps at least one of the previously scanned images rendered on the surface when the object placed on the surface;
   identifying, by the surface computer, a region of the surface upon which the object is placed;

scanning, by the surface computer using the scanner, an entire scan-able portion of the surface to create a surface image;

selecting, as an object image, a portion of the surface image that corresponds to the identified region of the surface;

cropping the object image from the surface image; and rendering, by the surface computer, the object image on the surface, wherein the object image is rendered wholly within the identified region of the surface without modifying portions of any of the plurality of previously scanned images rendered on the surface outside the identified region.

6. The computer program product of claim 5 wherein the object is a pictorial document.

7. The method of claim 1 wherein:

the method further comprises prompting, by the surface computer in response to detecting the object placed on the surface, a user regarding whether to scan the object and receiving, in response to prompting the user, a user indication instructing the surface computer to scan the object; and scanning, by the surface computer using the scanner, the entire scan-able region of the surface to create a surface image further comprises scanning, in response to receiving the user indication, the entire scan-able region of the surface to create the surface image.

8. The surface computer of claim 4 wherein:

the computer memory has disposed within it computer program instructions capable of prompting, by the surface computer in response to detecting the object placed on the surface, a user regarding whether to scan the object and receiving, in response to prompting the user, a user indication instructing the surface computer to scan the object; and scanning, by the surface computer using the scanner, the entire scan-able region of the surface to create a surface image further comprises scanning, in response to receiving the user indication, the entire scan-able region of the surface to create the surface image.

9. The surface computer of claim 4 wherein the object is a pictorial document.

10. The surface computer of claim 4 wherein the object is a text document.

11. The computer program product of claim 5 wherein:

the computer program product further comprises computer program instructions capable of prompting, by the surface computer in response to detecting the object placed on the surface, a user regarding whether to scan the object and receiving, in response to prompting the user, a user indication instructing the surface computer to scan the object; and scanning, by the surface computer using the scanner, the entire scan-able region of the surface to create a surface image further comprises scanning, in response to receiving the user indication, the entire scan-able region of the surface to create the surface image.

12. The computer program product of claim 5 wherein the object is a text document.

\* \* \* \* \*